Oct. 31, 1967     H. N. SEIGER     3,350,225
RECHARGEABLE SEALED SECONDARY BATTERY
Filed Jan. 12, 1965     3 Sheets-Sheet 1
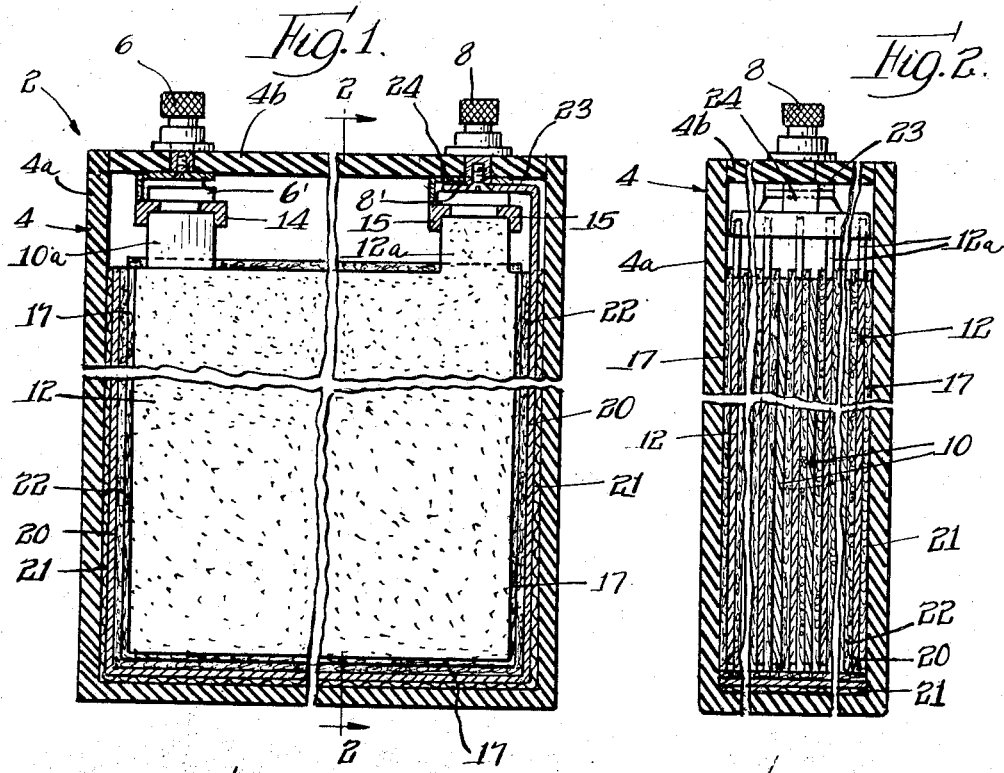
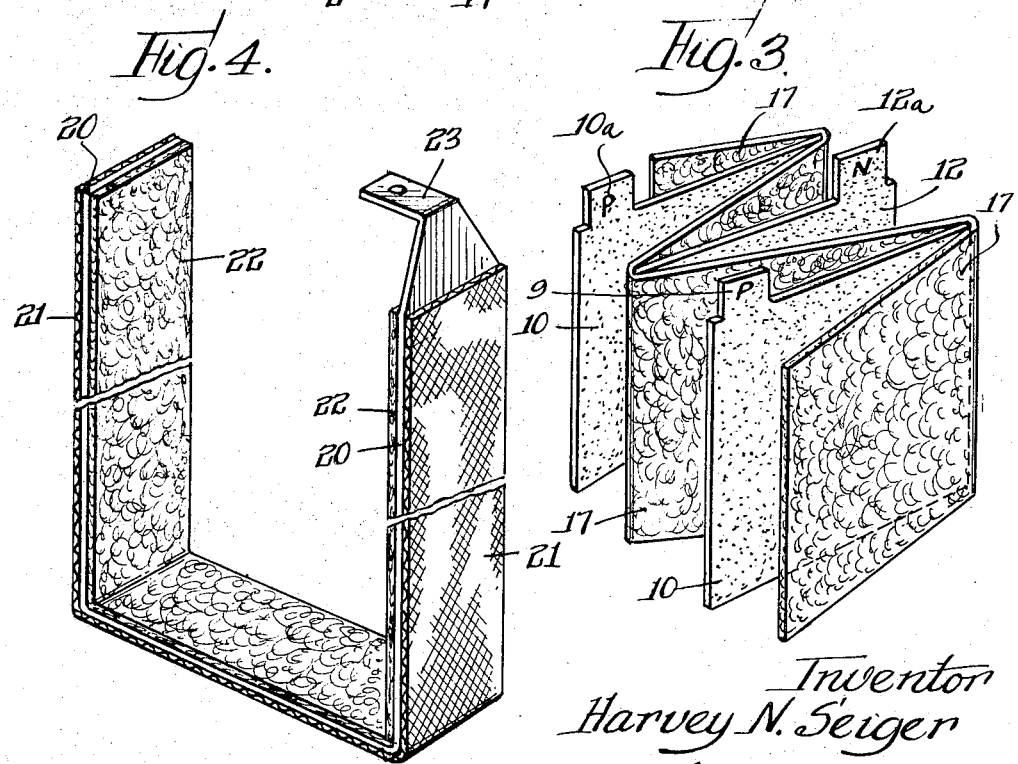
Inventor
Harvey N. Seiger
By: Wallenstein, Spangenberg & Hattis
attys.

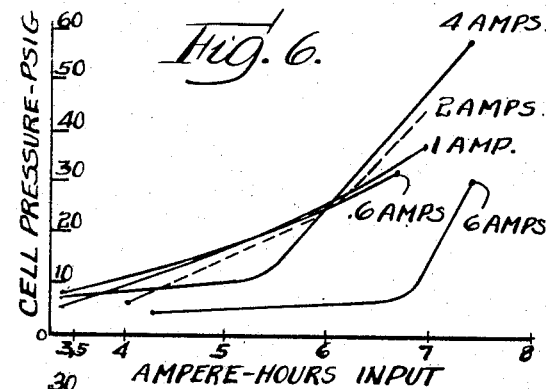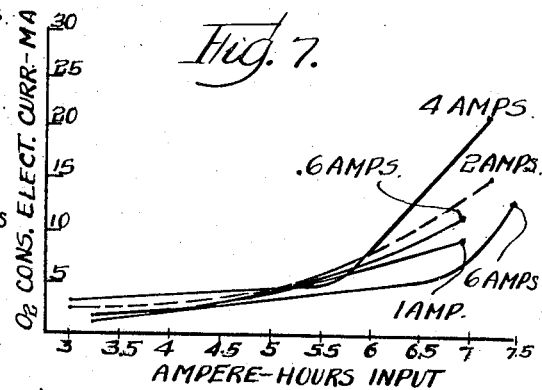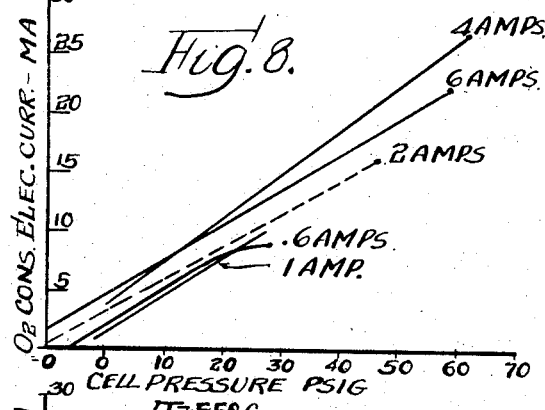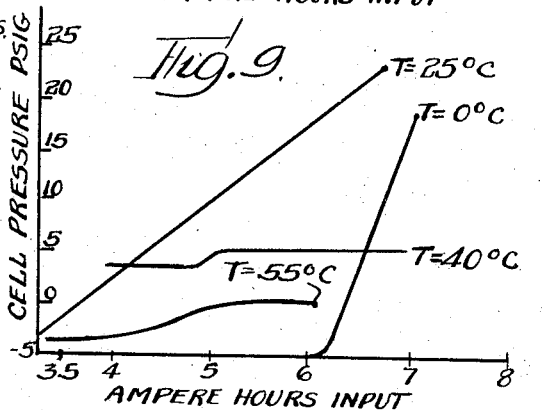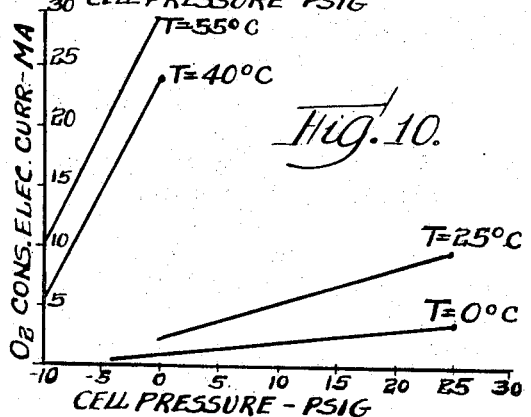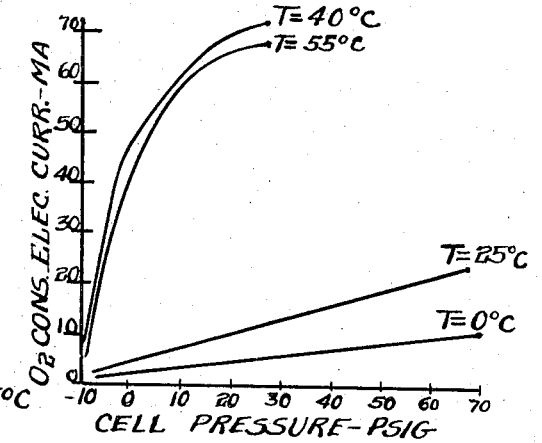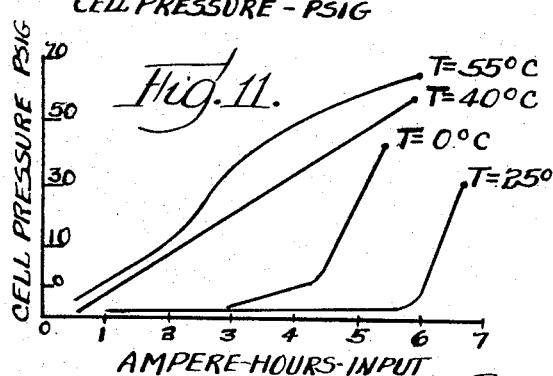

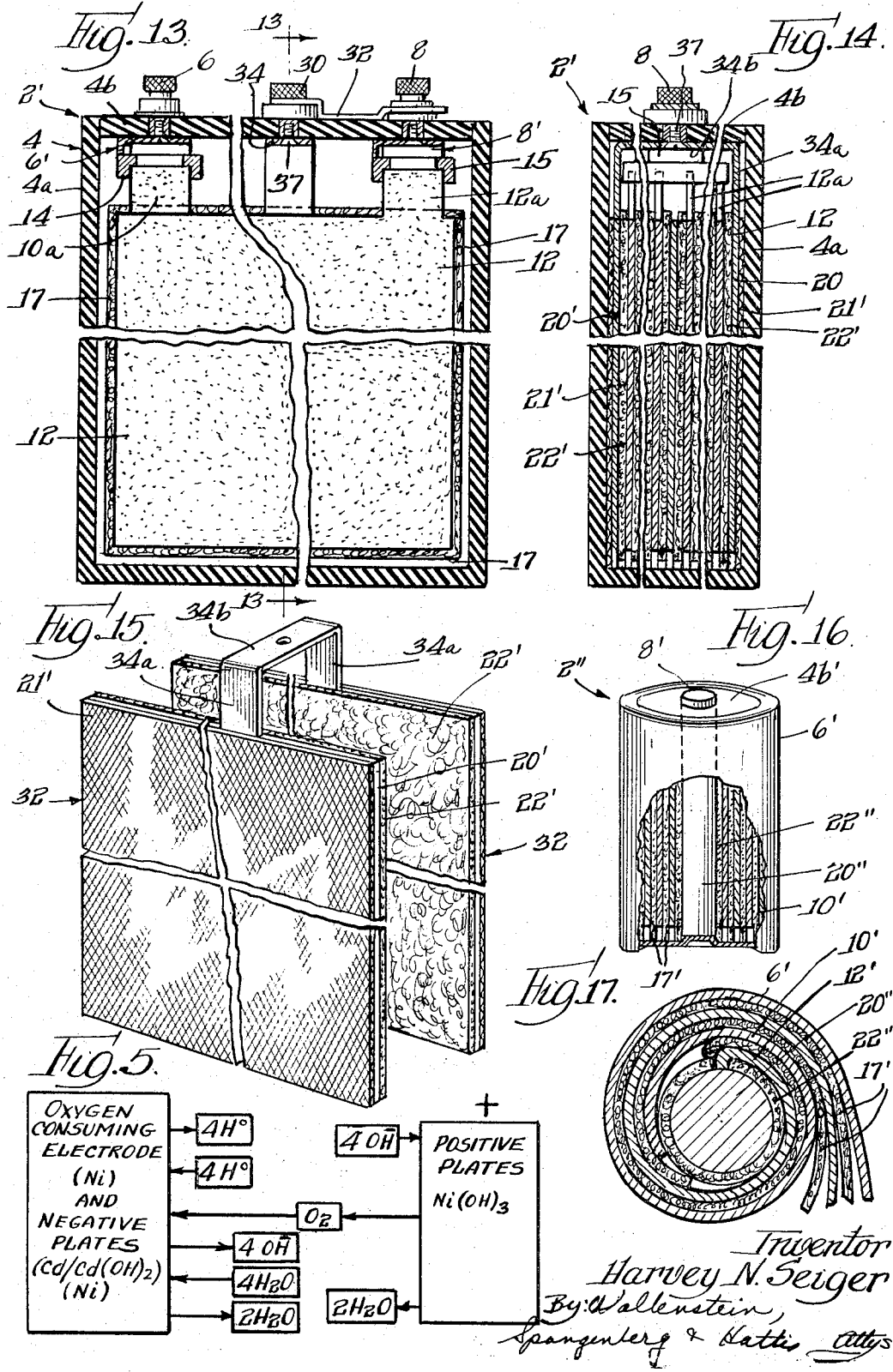

United States Patent Office 3,350,225
Patented Oct. 31, 1967

3,350,225
RECHARGEABLE SEALED SECONDARY
BATTERY
Harvey N. Seiger, East Brunswick, N.J., assignor to Gulton Industries, Inc., Metuchen, N.J., a corporation of New Jersey
Filed Jan. 12, 1965, Ser. No. 424,913
9 Claims. (Cl. 136—6)

This application is a continuation-in-part of application Ser. No. 343,771, filed Feb. 10, 1964, now abandoned.

My invention relates to a rechargeable sealed secondary battery of the type wherein overcharging of the battery generates oxygen at the positive plates which is desirably consumed in the cell to avoid build-up of excessive pressures. My invention has its most important application in alkaline nickel and silver-cadmium dry cell batteries.

The limited oxygen consumption capabilities of rechargeable sealed dry cell batteries of the type heretofore developed has resulted in undesired limitations in permissible charge rates which unduly prolongs the charging period in these batteries. The degree of oxygen generation and the criticality of charge rates have posed such particularly severe problems in silver-cadmium batteries, which are superior in many respects to nickel-cadmium batteries, that the use of silver-cadmium batteries has been severely restricted in consumer products where recharging would be carried out by unskilled persons and under uncontrolled or poorly controlled conditions.

Various means for absorbing the generated oxygen have been proposed, but these have been less than satisfactory for a number of reasons, among them being the excessive size of the battery resulting from the space requirements for the oxygen absorbing electrodes which must be added to provide adequate oxygen absorbing surface areas, and the problem in dry cell batteries of maintaining a film of electrolyte over oxygen absorbing surfaces involved for prolonged periods of time. Some of these problems may be due to the fact that much is unknown about the reactions and reaction mechanisms occurring in secondary batteries during overcharge.

It is an object of my invention to provide improved means for consuming the oxygen generated during the overcharging of rechargeable batteries so that, for a given overcharge rate, lower pressures will result in the batteries, or, for a given pressure within the battery, higher charge rates can be utilized safely to reduce the charging time thereof materially.

Another object of my invention is to provide improved means for consuming the oxygen generated in rechargeable dry cell batteries (as distinguished from wet cell batteries) which is effective for the normal expected life of the battery.

Still another object of my invention is to provide improved oxygen consuming means which is so effective in silver-cadmium rechargeable sealed dry cell batteries that such batteries can be safely used in consumer products where the charging operation is not carried out under closely controlled conditions.

A further object of my invention is to provide a secondary battery with an improved oxygen consuming electrode design resulting in a battery of minimum size for the battery requirements involved and utilizes a lesser amount of material to minimize the cost as well as the size thereof.

My invention has made possible a manifold increase in the safe charge rate of the dry cell batteries, reducing substantially the required charge time for the batteries. It also has materially increased the sensitivity of the oxygen consuming electrode to pressure changes within the cell. In the case of silver-cadmium batteries, the safe charge rate has been increased as much as ten fold and more over the customary safe charge rates. The invention has achieved these outstanding results without any increase in the size of the batteries involved, and, in the most preferred form of the invention, with an actual saving of negative active material (which is cadmium or cadmium hydroxide in the most commonly used cadmium batteries).

In conventional secondary batteries of the wet and dry type, some oxygen consumption occurs during overcharge at the surface of the negative battery plates but, for reasons probably not fully understood before my invention, the negative plates did not consume enough oxygen to prevent excessive pressure build-up at greater than normal charge rates. One approach heretofore utilized in increasing the oxygen consuming capabilities of wet cell batteries was the placing of an oxygen consuming electrode connected to the negative plates of the battery in a space provided therefor above the battery plates. The electrolyte was carried to the oxygen consuming electrode by means of an electrolyte absorbent wick which extended down from the electrode into a body of liquid electrolyte. However, I have found that this construction has significant disadvantages for dry cell batteries, among such disadvantages being the drying out of the wick. I have discovered that the drying out of the wick can be alleviated by placing one or more porous oxygen consuming electrodes, free of negative active material so that it can utilize all of its surface area for oxygen consumption, immediately contiguous to the battery plates, and, in the most preferred form of the invention, with the thickness of a wick separating the electrode from the battery plates or the separators thereof. Preferably, the electrode is placed next to one or more positive battery plates where it has been discovered water is generated during the overcharging (as well as the charging) of the battery. This water can readily reach the oxygen consuming electrode through the short path length of the wick thickness. Since the entire extent of the wick is near the point of water generation, the wick does not readily dry out. This shorter path length also results in a significant increase in the sensitivity of the oxygen consuming electrode to pressure changes in the cell which is important in certain application of the invention hereinafter to be referred to.

In one form of the invention, where the battery is a prismatic battery in which the battery plates comprise a stack of flat, parallel plates, the oxygen consuming electrode is part of a narrow elongated electrode assembly sandwiched between the side and outer edges of the battery plates and the battery casing walls and preferably occupying the full width of the battery interior. Prismatic batteries usually have a small clearance space between the edges of the plates and the casing walls which can accommodate such an assembly, so that this form of the invention can be applied to conventional prismatic batteries with practically no change in the battery size or construction. The electrode assembly preferably comprises a center strip of porous nickel, an outer layer of a perforated spacer material like nylon netting, and an inner layer of electrolyte absorbent material constituting the aforesaid wick. The wick contacts the edges of the battery plates or the separators thereof which usually extend around the side edges of the plates as well as between the plates. The netting leaves exposed most of the outer surface area of the nickel strip for contact with oxygen. (The inner side of the strip and the porous interior thereof are already substantially exposed to the oxygen.)

The invention is applicable to a spiral type dry cell secondary battery, where the battery plates comprise a spiral roll of a positive and negative plate separated by an electrolyte impregnated separator by placing a porous nickel or silver electrode connected to the negative plate of the battery in the center of the spiral roll where it is immediately contiguous to the battery plates.

I have further discovered that still additional improvements in the wetting of the wick are achieved by modifying the normal electrolyte volume in the battery so that a substantially greater than normal amount of electrolyte (such as a 10% increase in volume) is provided in the separators. It has been found that this results in an increased generation of water at the positive plates, thereby further improving the wetting of the wick. In the absence of the oxygen consuming electrode or the addition of other oxygen eliminating materials, the oxygen eliminating capabilities of the battery depend solely upon the ability of the negative plates thereof to consume oxygen at the interface between it and the electrolyte. In such case, the use of electrolyte in substantially above normal amounts, while not affecting oxygen generation would, to a certain extent, hinder the migration of the oxygen to the negative plates to the extent that the pressure within the sealed battery housing would build-up to dangerous levels even at moderate charging levels and tend to cause disintegration of the battery. It is believed that the use of such abnormal concentrations of electrolytes have not been considered even in batteries provided with oxygen consuming electrodes. Although this aspect of the invention has its most important application in dry cell batteries where the oxygen consuming electrode is adjacent the battery plates, it is also applicable to dry cell batteries where the electrode is supported in a space above the plates as disclosed in said application Ser. No. 343,771.

During the charging of a nickel-cadmium battery, the divalent nickel hydroxide [$Ni(OH)_2$] of the positive plates is oxidized to trivalent nickel hydroxide [$Ni(OH)_3$] and the cadmium hydroxide [$Cd(OH)_2$] of the negative plates is reduced to metallic cadmium. It thus appears that, during the charging of the battery, two molar amounts of nickel hydroxide are oxidized for each molar amount of cadmium hydroxide which is reduced. After all the cadmium hydroxide is reduced to cadmium and all of the divalent nickel hydroxide has been oxidized to trivalent nickel hydroxide, the battery will act as an electrolytic cell generating oxygen gas ($O_2$) at the positive plates and hydrogen ($H_2$) at the negative plates. Such generation of hydrogen gas at the negative plates would result in a very serious buildup of pressure within the battery which, unlike the generation of oxygen gas, cannot readily be consumed within the battery.

To prevent the just described hydrogen gas generation, it was heretofore thought necessary to use an amount of the negative acting material (cadmium hydroxide in the exemplary battery being described) in substantial excess of the equivalent amount of positive acting material (divalent nickel hydroxide in the exemplary battery being described) so that, after the nickel hydroxide is fully consumed, cadmium hydroxide remains during the overcharge period (i.e., after the nickel hydroxide is fully oxidized). Thus, the amount of cadmium hydroxide heretofore used in the negative plates is commonly as high as 40% in excess of the equivalent amount of divalent nickel hydroxide used in the positive plates. Since the molecular weight of cadmium is 112.4 and that of nickel is 58.7, the amount of cadmium hydroxide used for a 40% excess was $1.4 \times 112.4/2$ or 78.68 grams of cadmium hydroxide for each 58.7 grams of nickel hydroxide. It has been discovered by using the oxygen consuming electrode of my invention that an excess of divalent cadmium hydroxide (related to the equivalent amounts of the material as explained above) is not necessary to prevent hydrogen generation during overcharge. For example, the use of only 56.2 grams of cadmium hydroxide to each 58.7 grams of divalent nickel hydroxide, namely equivalent amounts of these materials, will prevent the generation of hydrogen during overcharge. Thus, a prismatic type battery using a substantial excess of cadmium hydroxide can be converted to a battery of the present invention by simply replacing one or more of the negative plates by porous nickel plates of about the same size forming oxygen consuming electrodes as described above. This reduces the amount of negative active material, eliminating the excess thereof.

The above and other objects, features and advantages of the invention will become apparent upon making reference to the specification, claims and drawings wherein:

FIG. 1 is a vertical sectional view through a sealed dry cell secondary battery of the prismatic type incorporating features of my invention;

FIG. 2 is a transverse section through the battery taken substantially along the line 2—2 in FIG. 1;

FIG. 3 is a perspective view showing positive and negative plates of the battery of FIG. 1 in expanded form;

FIG. 4 is a perspective view of an exemplary oxygen consuming electrode assembly forming part of the battery of FIG. 1;

FIG. 5 is a diagrammatic view illustrating the manner in which water is consumed at the negative plates and oxygen consuming electrode of the invention and is generated at the positive plates of a nickel-cadmium battery during overcharge;

FIGS. 6–12 show various characteristic curves of the battery of FIGS. 1–4;

FIG. 13 is a vertical sectional view of a modified, sealed, prismatic, dry cell, secondary battery of my invention wherein one or more oxygen consuming electrodes replace one or more of the negative battery plates;

FIG. 14 is a transverse sectional view through the battery of FIG. 13, taken substantially along the line 14—14 thereof;

FIG. 15 is a perspective view of the oxygen consuming electrode structure of the battery of FIG. 14;

FIG. 16 is a perspective view, partly broken away, showing the application of my invention to a cylindrical type secondary cell used in flashlights and the like; and FIG. 17 is a fragmentary, enlarged, transverse, sectional view of the interior of the cylindrical battery of FIG. 16.

The broad aspects of my invention are applicable to batteries having a variety of configurations and constructions, and so the batteries which are illustrated in the drawings represent only preferred forms which the batteries of my invention may take. As previously indicated, most of the aspects of the present invention have particular, although not their only, application to alkaline sealed dry cell batteries of which the nickel-cadmium and silver-cadmium batteries are the most important examples.

Referring now more particularly to the form of my invention shown in FIGS. 1–4, the battery 2 there shown includes a housing 4 comprising an open top housing body 4a of generally rectangular configuration which may be made of insulating material or metal. The open top of the housing body 4a is closed by a top wall 4b which is most advantageously made of insulating material. The top wall of the housing carries a positive terminal 6 and a negative terminal 8 which may be screw terminals to which the circuits to be energized by the battery are suitably connected. The terminals 6 and 8 have conductive portions 6′ and 8′ extending through and below the top wall 4b.

As previously indicated, my invention has its most important application in nickel-cadmium and silver-cadmium sealed dry cell batteries. Where the battery 2 is a nickel-cadmium battery, in the discharged state thereof the positive plates 10 comprise divalent nickel hydroxide [$Ni(OH)_2$] impregnated into sintered porous nickel base plates and the negative plates 12 comprise cadmium hydroxide [$Cd(OH)_2$] impregnated into sintered nickel base plates. In a silver-cadmium battery, silver hydroxide is substituted for the nickel hydroxide in the positive plates.

In the illustrated prismatic type battery, the battery plates have a generally rectangular configuration and are stacked in spaced parallel relation. The positive plates 10 have a series of connecting tabs 10a arranged in alignment and electrically connected in any suitable way to the positive terminal extension 6' as by a suitable contact means 14 engaging all of the tabs 10, and the negative plates 12 have similar aligned tabs 12a which are connected by contact means 15 to the negative terminal extension 8'.

The positive and negative plates 10 and 12 alternate in position and layers 17 of electrolyte impregnated separator material are sandwiched between the adjacent pairs of positive and negative plates. The separator may comprise a fibrous material, such as nylon matted into a highly liquid absorbent body. In the illustrated embodiment of the invention, the separator layers comprise a single length of separator material passing in zig-zag fashion between the various pairs of plates and around the sides thereof. The separator materials also project a short distance beyond the normally top and bottom edges of the plates.

As previously indicated, one aspect of the present invention relates to the placement of a special oxygen consuming electrode most advantageously in a space immediately contiguous to the battery plates. In the form of the invention shown in FIGS. 1 through 4, the electrode identified by reference numeral 20 is a narrow porous strip of nickel or silver, most advantageously nickel, sandwiched between an outer layer 21 of perforated material, such as nylon netting, and an inner layer 22 of an electrolyte absorbent material, which may be the same material used for the separator layers of the battery plates, forming a wick for carrying aqueous electrolyte by capillary action to the porous strip 20. The preferred electrolyte is a 30–34% aqueous solution of potassium hydroxide.

The electrode 20 consumes oxygen generated during the overcharge of the battery and, in the generalized form of the invention, is a metal maintained at a potential of about −0.8 volt and, in conjunction with the active material of the negative plates, forms a couple producing hydrogen atoms (as distinguished from hydrogen gas) which are adsorbed on the surface of the electrode. If the potential of the electrode is much more negative than −0.8 volt (like −1.0 volt), hydrogen gas undesirably would be evolved by electrolysis of water, and, if the potential thereof is much less negative than −0.8 volt (like −0.6 volt), inadequate amounts of hydrogen atoms will usually be present on the electrode. The potential of −0.8 volt is achieved by connecting the electrode 20 through a low resistance path (i.e. a path producing a negligible voltage drop) to a negative plate having this potential during the reduction process which takes place thereat. Cadmium has such a potential in a negative battery plate. To this end, the electrode strip 20 has an extension 23 which, in the illustrated form of the invention, is anchored to the negative terminal 8 in any suitable fashion, as by a screw 24 which clamps the extension 23 against a terminal strip 24 forming part of the contact means 15.

When the electrode assembly comprising the nylon netting 21, the strip 20 and the wick 22 are in position around the side and outer or bottom edges of the stack of battery plates as shown in FIG. 1, the wick 22 will be in contact with the electrolyte impregnated separator layers 17 bending around the outer edges of the battery plates. As previously indicated, water is generated at the positive plates during the overcharge of the battery and some of this water, along with the electrolyte dissolved therein, is readily carried by capillary action through the relatively short paths involved to the electrode strip 20. When the battery initially is assembled, the wick 22 is impregnated with the same amount of aqueous electrolyte as the separator 17 of the battery plates.

The maintenance of an electrolyte wetted wick 22 is materially enhanced by utilizing an increased volume of electrolyte in the separator layers and the wick over that which would be normally safely used in the separators of a battery of the type involved. Thus, if the electrolyte volume of the electrodes and separator is 20 cc., then the amount of electrolyte is preferably increased by about 10% or more so that it is, for example, about 22 cc. aqueous potassium hydroxide electrolyte of the same concentration referred to previously.

As an aid in the understanding of my invention it would be helpful to explore what are believed to be some of the chemical reactions which take place during overcharging of the battery being described. The nature of the electro-chemical reactions occurring at the plates of nickel-cadmium and silver-cadmium type batteries is still not completely understood. However, during charge and overcharge it appears that there is a net production of water at the positive plates and a net consumption of water at the negative plates in accordance with the following equations:

(1) Positive plates:

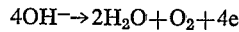

(2) Oxygen consuming electrode and negative plates:

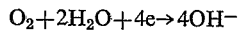

The second reaction is really the sum of two reactions as follows:

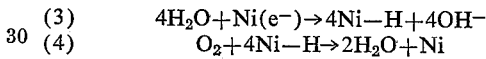

From these equations it is seen that: (a) there is a production of water at each positive plate as given by Equation 1; and (b) there is a consumption of water at each negative plate and the auxiliary electrode as given by Equation 2. This is shown more clearly by Equations 3 and 4, where four moles of water are consumed and only two moles of water are given up for each mole of oxygen consumed. This represents a net loss of two moles of water; therefore, the oxygen consuming electrode is susceptible to drying out and decreasing its performance. Thus, by placing wick 22 adjacent to the positive plates, the wick is positioned near the point of water generation in the battery which assures the continued wetting of the wick. FIG. 5 illustrates the above reactions.

In wet cell batteries, it was known that oxygen could not readily pass between the positive and negative plates because the body of liquid electrolyte inhibits the passage of oxygen between the plates, and so an oxygen consuming electrode connected to the negative plates was removed to a space above the body of electrolyte where it could not serve as a battery plate, but where it was observed oxygen consumption took place. I believe that the mechanism of the oxygen consumption is probably due to hydrogen atoms adsorbed on exposed surfaces of a particular metal which effects generation of hydrogen atoms through a couple reaction, to be described below, with the negative active material of the negative battery plates. In any event, instead of utilizing the inefficient negative battery plates with its limited area of exposed nickel or silver sites due to the presence of negative active material, I place in a dry cell, near the battery plates where the drying out problem is avoided, a separate porous electrode free of negative or positive active material or any material other than the electrolyte which would reduce the area of the nickel or silver exposed to the electrolyte film referred to. While, most desirably, the aforesaid separate porous electrode is entirely free of all materials other than electrolyte, as, for instance, negative or positive active material, the presence of small amounts of such material not detrimental to the operation of the battery could be present. Thus, when the expression "free of . . . materials" is used, it will be understood to encompass complete or essentially complete freedom from, or the presence of, small amounts of materials insufficient adversely to affect the desired functioning of said separate porous electrode.

The aforementioned corrosion couple consists of the Cd/Cd(OH)$_2$ of the negative plates in electrical contact with the nickel or silver of the oxygen consuming electrodes. Depicted electro-chemicaly, the corrosion couple with nickel is:

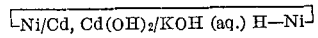

where the connecting line indicates the spaced nickel areas electrically connected through the electrolyte. During overcharge, the reactions at the corrosion couple are believed to be as follows:

(5) $\quad 2Cd+4OH^- \rightarrow 2Cd(OH)_2+4e$ (6) $\quad 4H_2O+4e \rightarrow 4H°+4OH^-$ The Cd/Cd(OH)$_2$—Ni couple is believed to provide by reaction (5) the electrons which form adsorbed hydrogen atoms on the nickel surface by reaction (6).

As oxygen arrives at the negative plates, it reacts chemically with the adsorbed hydrogen as follows:

(7) $\quad O_2+4H° \rightarrow 2H_2O$

Batteries like that just described (modified by disconnecting the electrode 20 from the terminal 8, connecting the extension to a separate terminal—like 30 in FIG. 13—and connecting a low resistance meter between the terminal 30 and the negative terminal 8) were tested to obtain pressure, charge rate, temperature and state-of-charge curves shown in FIGS. 6–12.

The pressure changes during charge at room temperature at several charge rates are shown in FIG. 6. The relative charge efficiencies of the positive electrodes are apparent in this figure. The corresponding curves for the oxygen consuming electrode currents during the charge are shown in FIG. 7. A plot of the oxygen consuming electrode current versus cell pressure is shown in FIG. 8 for the various current shown. The data in FIG. 8 show a linear relationship between pressure and current. No definite effect due to charge rate is readily observed. The slopes of the curves are nearly the same.

The effect of temperature on the pressure and oxygen consuming electrode currents was determined at the .6 and 6 ampere charge current levels. The pressure rise during .6 ampere charge at the temperatures tested is shown in FIG. 9. At 40° C. and 55° C. the pressures in the cells reach stable values. These curves also indicate that the ampere-hour input point at which oxygen production becomes the major process at the positive electrode is greater at 0° C. than at 25° C. The pressure curves are shown in FIG. 10. The linear relationship is again found, and the slopes at 40° and 55° are much greater than 0° and 25° C.

The pressure rise during a 6 ampere rate chare at the selected temperatures is shown in FIG. 11. The points at which the production of oxygen increases in magnitude again show that the cells are more effectively charged at the lower temperature, although the curves for 0° and 25° C. are not in the correct order for a complete generalization. The oxygen consuming electrode currents show the linear dependence on pressure for the lower temperatures (FIG. 12).

The previous experiments were run after the cells had been discharged at 3 amperes to 1.0 volt. To determine any effects due to the state-of-charge, the cells were charged to 3.6 ampere-hours and then rested overnight. The cells were then placed on charge again. The interruption of charge current does not affect the current-pressure relationship.

The slope of the pressure-current curve for the oxygen consuming electrode is dependent upon its projected area and also upon the ability to transfer water to the oxygen consuming electrode. The larger oxygen consuming electrode with more efficient water transfer paths yield the larger currents for a given pressure.

During testing, the oxygen consuming electrode current at which the charge was interrupted was varied to determine the effect on charge input. These results are given in Table I, where it may be seen that the extent of overcharging may be controlled by the oxygen consuming electrode current.

*Table I.—Charge input dependence on electrode signal level*

| Oxygen consuming electrode cut-off: ma | Ampere-minutes charge average |
|---|---|
| 18 | 211 |
| 15 | 206 |
| 12 | 190 |

Referring now to the form of the invention shown in FIGS. 13 through 15 which show a prismatic battery of the general type shown in FIG. 1, modified by the addition of a third terminal 30 on the cover 4b of the battery casing. A modified oxygen consuming electrode arrangement shown in FIG. 15 is provided. This modified oxygen consuming electrode arrangement is constructed to take the place of one or more negative battery plates. As illustrated, the two outer negative battery plates 12—12 and the associated outermost separators layers shown in FIG. 2 are replaced by a pair of electrode assemblies 32—32 each having the approximate size of one of the battery plates and each comprising an outermost layer 21' of nylon netting or similar perforated insulating material, a central layer 20' of porous nickel, silver, etc, constituting the oxygen consuming electrode, and an inner layer 22' of electrolyte absorbent material constituting a wick. The oxygen consuming electrodes 20'—20' of the assemblies 32—32 are interconnected by a suitable conductive link which, in the illustrated form of the invention being described, has an inverted U shape with vertical arms 34a—34a and a connecting arm 34b. The connecting arm 34b is anchored in a suitable way, such as by a clamping screw 37, to a portion of the terminal 30 extending through the upper wall 4b of the battery casing.

The terminal 30 is shown connected to the negative terminal 8 of the battery by a removable metal link 32. The metal link 32 is utilized in what is sometimes referred to as the passive mode of the present invention wherein electrodes 20'—20' are continuously used as oxygen consuming electrodes during overcharge in a manner analogous to that described in connection with the embodiment of FIGS. 1 through 4. The link 32 is removed when it is desired to eliminate an overcharge condition by automatically disconnecting the charge circuit from the battery when an overcharge condition is reached. In such case, a small resistance (not shown) like 2 ohms is placed between the terminals 30 and 8 which does not materially modify the voltage of the electrodes 20'—20'. The voltage across the resistance will, in such case, be a measure of the current flow in the oxygen consuming electrode circuit. It has been discovered that the current flow in, or the voltage drop across, this low resistance is a measure of the pressure in the battery, and, by placing a voltage level detector (not shown) across this resistance which opens the charge circuit when this voltage reaches a certain level indicating that the battery is being overcharged, an exceedingly flexible and effective overcharge inhibiting circuit is provided.

The form of my invention shown in FIGS. 13 through 15 is suited extremely well to the situation wherein an excess of the negative active material, namely the cadmium or cadmium hydroxide, is eliminated without the undesirable hydrogen gas generation. Thus, assuming that, in the battery of FIGS. 1 through 4, a 20% excess of cadmium hydroxide is present in the pores of the negative battery plates when the battery is fully discharged, the removal of two negative plates can result in equivalent amounts of positive and negative active material (two molar amounts of nickel hydroxide to ane molar amount of cadmium hydroxide). As previously indicated, this will unexpectedly not result in generation of hydrogen gas if an efficient oxygen consuming electrode system is utilized in the battery. The elimination of the negative battery plates results in a saving of cadmium hydroxide and space in which the oxygen consuming electrode assemblies 32—32 can be placed.

Referring to FIGS. 16 and 17, which illustrate the application of my present invention to a cylindrical type secondary dry cell battery 2″ such as used in flashlights and the like, in this form of my invention a pair of thin flexible positive and negative plates 10′ and 12′, respectively, are overlaid by layers 17′ of electrolyte impregnated separator material and then rolled into a cylinder. A porous cylindrical body 20″ of porous nickel, silver etc. forming an oxygen consuming electrode is positioned within the center of the rolled battery plates. A layer 22″ of electrolyte impregnated material forming a wick is positioned around the porous oxygen consuming electrode 20″. The inner end of the negative plate 12′ is terminated short of the inner end of the positive plate 10′ so that the electrode 20″ is positioned opposite the positive plate, where, as previously indicated, water is generated during the charge and overcharge of the battery. The electrode 20″ and the negative plate 12′ are electrically connected together and to a negative terminal 8′ centered on the outside of one of the ends of the battery 2″ through low resistance connections. The terminal 8′ is separated by an insulating wall 4b′ from the outer wall 6′ of a metal casing constituting the positive terminal of the battery. The metal wall 6′ is connected in any suitable fashion through a low resistance connection to the positive plate 10′ of the battery. The electrode 20″ operates as an oxygen consuming electrode in the same manner previously described in connection with the form of the invention of FIG. 1.

As indicated in the earlier part of the specification, the various aspects of the present invention have resulted in substantially higher permissible charge rates resulting in substantially reduced charge periods. These advantages have been achieved without increasing the size of the battery and with the addition of a few inexpensive, compact parts. Also of great significance is that these advantages are achieved in dry cell batteries where it is especially difficult to use effectively oxygen consuming electrodes.

It should be understood that various modifications may be made of the most preferred forms of the invention described above without deviating from the broader aspects of the invention. For example, the arrangement of the oxygen consuming electrode immediately opposite, but spaced by a thin wick from a positive plate where water is generated during charge and overcharge is an important specific aspect of the invention. A less preferred arrangement nevertheless coming within the broader aspect of the invention is where the oxygen consuming electrode is placed next to a negative plate of the battery where, by capillary action and its still relative close spacing to a positive plate on the other side of the negative plate, a satisfactory continued wetting of the electrode with aqueous electrolyte will normally occur.

I claim:

1. In a rechargeable, sealed dry cell secondary battery including a casing having positive and negative terminals, positive and negative plates within said casing electrically connected respectively to said positive and negative terminals, said plates respectively having oxidizable and reducible materials which undergo reversible chemical reactions during the charge and discharge of the battery, and an aqueous electrolyte impregnated separator means between said plates, the improvement in combination therewith comprising: a porous oxygen consuming electrode in the casing, the electrolyte in said separator means being substantially in excess of the quantity normally used in such batteries wherein the pressure resulting from the unabsorbed oxygen during charge would normally build-up to abnormally high levels which said casing could not withstand in the absence of the oxygen consuming electrode, and additional water is generated in the chemical reactions taking place in the battery as a result of such excess electrolyte, the water and electrolyte in said separator means spreading as a lasting liquid film over a substantial surface area of said oxygen consuming electrode, and means electrically connecting said oxygen consuming electrode to the negative terminal of the battery through a low resistance path, the oxygen generated at each positive plate migrating to the area of oxygen consuming electrode where it is consumed at the surface thereof at a rate which prevents said excessive pressure.

2. In a rechargeable, sealed, dry cell, secondary battery including a casing having negative and positive terminals, positive and negative plates within said casing electrically connected respectively to said positive and negative terminals and having positive and negative active materials which are respectively oxidized and reduced during the charging of the battery and reduced and oxidized during the discharging thereof, and an aqueous electrolyte impregnated separator means between said plates, the improvement comprising in combination therewith: a porous oxygen consuming electrode in said casing which electrode is at a negative potential which is insufficiently negative to cause an electrolysis reaction thereat, said oxygen consuming electrode having oxygen absorbing surfaces on the interior and exterior of the porous body thereof and being free of all positive and negative active materials so substantially all of the surface area thereof is available for oxygen absorption, said oxygen consuming electrode being immediately contiguous to said battery plates, there being a short aqueous electrolyte containing path between the battery plates and said porous oxygen consuming electrode wherein aqueous electrolyte is continuously carried from the immediate vicinity of the battery plates over a short path to the electrode to maintain only a thin aqueous electrolyte film thereon.

3. The battery of claim 2 wherein said oxygen consuming electrode is separated from said battery plates by a layer of electrolyte impregnated material wherein aqueous electrolyte is readily continuously carried over a short path to said oxygen consuming electrode where it forms a film over the surface thereof.

4. The battery of claim 2 wherein the electrolyte in said separator means is in excess of the quantity normally used in such batteries, wherein the pressure resulting from the unabsorbed oxygen during charge would normally build-up to abnormally high levels which said casing could not withstand in the absence of the oxygen consuming electrode and additional water is generated in the chemical reaction taking place in the battery as a result of such excess electrolyte.

5. The battery of claim 2 wherein said positive and negative plates are in spaced parallel stacked relation, and said oxygen consuming electrode comprises a strip of material wrapped around the edges of said plates.

6. The battery of claim 2 wherein said positive and negative battery plates are thin, rigid plates in parallel, stacked relation, and said oxygen consuming electrode comprises a plate contiguous and parallel to and forms part of the stack of positive and negative plates.

7. The battery of claim 2 wherein said positive and negative battery plates comprise a spiral roll of the plates with the separator means therebetween, and said oxygen consuming electrode comprises a body of porous material in the center of the spiral winding of the positive and negative plates.

8. The battery of claim 7 wherein the inner end of the negative plate terminates short of the positive plate, the positive plate thereby extending beyond the end of the negative plate so that the positive plate is directly opposite said oxygen consuming electrode.

9. The rechargeable, sealed, dry cell secondary battery of claim 2 wherein said oxygen consuming electrode forms a couple with the negative acting material in the negative plates which provides a source of hydrogen atoms over most of the area of the oxygen consuming electrode with which the oxygen combines.

References Cited

UNITED STATES PATENTS

| | | |
|---|---|---|
| 2,349,763 | 5/1944 | Setzer. |
| 2,934,580 | 4/1960 | Neumann _____ 136—28 XR |
| 2,980,745 | 4/1961 | Peters _____ 136—28 XR |
| 3,080,440 | 3/1963 | Ruetschi et al. _____ 136—3 |
| 3,089,913 | 5/1963 | Garten et al. _____ 136—28 XR |
| 3,132,053 | 5/1964 | Krebs _____ 136—3 |

WINSTON A. DOUGLAS, *Primary Examiner.*

B. OHLENDORF, A. SKAPARS, *Assistant Examiners.*